(12) United States Patent
Arndt

(10) Patent No.: US 6,826,611 B1
(45) Date of Patent: Nov. 30, 2004

(54) APPARATUS AND METHOD FOR AUTOMATICALLY OBTAINING A VALID IP CONFIGURATION IN A LOCAL AREA NETWORK

(75) Inventor: Manfred R. Arndt, Folsom, CA (US)

(73) Assignee: Fluke Corporation, Everett, WA (US)

( * ) Notice: Subject to any disclaimer, the term of this patent is extended or adjusted under 35 U.S.C. 154(b) by 641 days.

(21) Appl. No.: 09/676,631

(22) Filed: Sep. 30, 2000

(51) Int. Cl.[7] ............................................ G06F 15/173
(52) U.S. Cl. ................. 709/226; 709/200; 709/222; 707/10; 702/186; 702/188; 370/252; 370/253; 370/400
(58) Field of Search ................................. 709/200, 222, 709/226; 707/10; 370/400, 252, 253; 702/186, 188

(56) References Cited

U.S. PATENT DOCUMENTS

| | | | |
|---|---|---|---|
| 5,724,510 A | | 3/1998 | Arndt et al. ................ 709/220 |
| 5,854,901 A | | 12/1998 | Cole et al. ................... 709/245 |
| 5,918,016 A | * | 6/1999 | Brewer et al. .............. 709/220 |
| 5,974,547 A | * | 10/1999 | Klimenko .................... 709/220 |
| 6,097,727 A | * | 8/2000 | Peters ......................... 370/400 |
| 6,101,499 A | * | 8/2000 | Ford et al. .................... 707/10 |
| 6,345,294 B1 | * | 2/2002 | O'Toole et al. ............. 709/222 |
| 6,601,093 B1 | * | 7/2003 | Peters ......................... 709/220 |

FOREIGN PATENT DOCUMENTS

WO 00/63779 10/2000

* cited by examiner

Primary Examiner—Jack B. Harvey
Assistant Examiner—Hai V. Nguyen
(74) Attorney, Agent, or Firm—Dellett & Walters

(57) ABSTRACT

A apparatus and method for automatically determining a valid IP configuration on a network analyzes traffic and determines valid subnets. A likely unused start IP address in a subnet is selected and checked to determine its availability. If not available, the start address is decremented, and tested again, until a valid address is obtained.

20 Claims, 6 Drawing Sheets

APPARATUS AND METHOD FOR AUTOMATICALLY OBTAINING A VALID IP CONFIGURATION IN A LOCAL AREA NETWORK

BACKGROUND OF THE INVENTION

This invention relates to networks and more particularly to a method and device for automatically obtaining a valid IP configuration in a LAN and a test instrument for networks.

In switched network configurations, issues arise related to how to obtain an IP address for a device connected to the network and how to confirm the validity of IP addresses of devices on the network. Since in a switched environment, any given port will only see limited traffic passing by, (typically only traffic that is directed to that port), the amount of observable data is limited. Or, often, only broadcast traffic will be visible at the port to which a device is connected.

A device desires to select a valid IP address to use in operating on the network. However, because incorrect subnet mask and mis-configured IP addresses continue to occur on modern networks, it can be difficult to identify correct local address ranges, since conflicting and overlapping results may be obtained by observing network traffic. If an address is accidentally selected by a device that is already in use by another device on the network, the inadvertent selection of that IP address will result in other network devices incorrectly updating their address caches, which may result in traffic intended for the original valid owner of that IP address being lost or mis-delivered. This is highly undesirable, especially for a test instrument, which should not itself cause problems on the network.

Further, selection of a proper subnet mask and default router by a device is essential, because if the mask and router are not correct, the device won't communicate properly with other devices on the network. Selection of a proper domain name server (DNS) is important, too. The domain name server returns an IP address that corresponds to a symbolic name that is easier for a user to remember than a cryptic IP address would be. An improper DNS selection will not allow name resolution to occur if the DNS does not know the IP address associated with the particular name. The device might not even be able to communicate with the improper DNS selection.

A particular network may employ subnet masks, wherein IP addresses are masked with a mask value to obtain a range of IP address (e.g. A.B.C.64 through A.B.C.127). Valid IP addresses on this subnet have the last part of the address in the range 64–127. If a test instrument (or other device) does not employ an IP address within that range (e.g. A.B.C.250, which is outside the 64–127 range), replies from other devices on the network will not come back to the device because other devices sill send the packets to a router to forward to the network that the IP address should reside on (A.B.C.250 in this example) and the data won't be received by the device.

In the past, a single contiguous range of IP addresses would be used on a given network, and IP addresses outside that range had to go through a router. However, it is now common to have many non-contiguous IP address ranges on the same network cable. Determining which range is valid can be difficult.

Prior test devices required a user to supply an IP address for the device to use, requiring a level of knowledge of the network, and, relying on the hope that no devices were improperly configured with an invalid IP address.

Having two or more devices with duplicate IP addresses can result in intermittent network problems. On an Ethernet, for example, IP addresses are resolved to hardware address (the address of the MAC (media access controller)). Individual devices will maintain an ARP cache (address resolution protocol) of the MAC addresses (typically 48 bits), to avoid having to ARP each time the network is to be accessed. Performing an ARP for an IP address that is in use by more than one host on the network will result in multiple replies and indeterminate updating of the ARP caches of other hosts on the network. So, frames transmitted to the duplicate IP address will go to the wrong device part of the time, since the MAC address in the ARP cache is changing often. Then, occasionally, a host will have its ARP cache updated so the mapping of the IP addresses to the MAC addresses now shows the "desired owner" of the IP address. At that time, the ARP cache update results in transmissions going to the proper device. So, for no readily apparent reason (to the user), communications will inadvertently start working again. Such situations are to be avoided if at all possible, as the test instrument should not corrupt the network.

SUMMARY OF THE INVENTION

In accordance with the invention, a method for obtaining an IP configuration automatically when a configuration is not obtainable by DHCP (Dynamic Host Configuration Protocol), traffic is continuously monitored to identify local addresses, corresponding subnet masks, local routers and servers. The information collected is stored in a database and after a period of time, valid and invalid IP subnets are determined.

Accordingly, it is an object of the present invention to provide an improved network test instrument that automatically obtains a valid IP configuration without corruption of other network hosts or the like.

It is a further object of the present invention to provide an improved method for automatically obtaining a valid IP configuration for any portable networking device.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises a network analysis instrument and method wherein a valid IP configuration is automatically obtainable.

Figure 1:
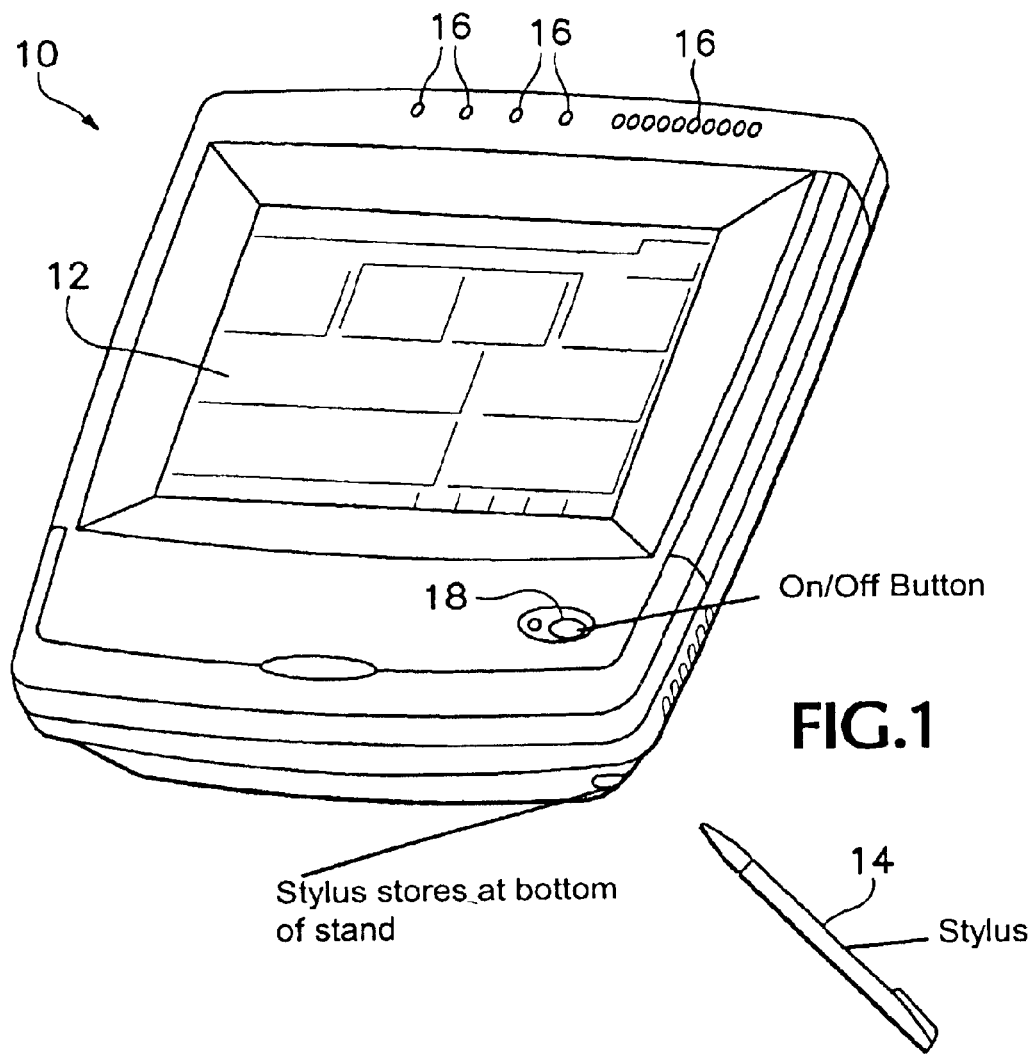
FIG. 1 is a perspective view of a test instrument employing the method of automatically obtaining a valid IP configuration.

FIG. 1 is a perspective view of a representative network test instrument embodying the invention. The instrument 10 suitably is configured as a portable instrument for network testing and analysis. A display region 12 enables user interaction with the instrument. The display is suitably a touch screen type display, and a stylus 14 is employable by a user to interact with the device. Various status indicators are provided along the top of the case, to indicate link status, transmit, collision, error, percentage utilization and the like. A power button 18 is provided, also. The device is suitably powered by an internal battery system, but may also be connected to an external power source.

Figure 2:
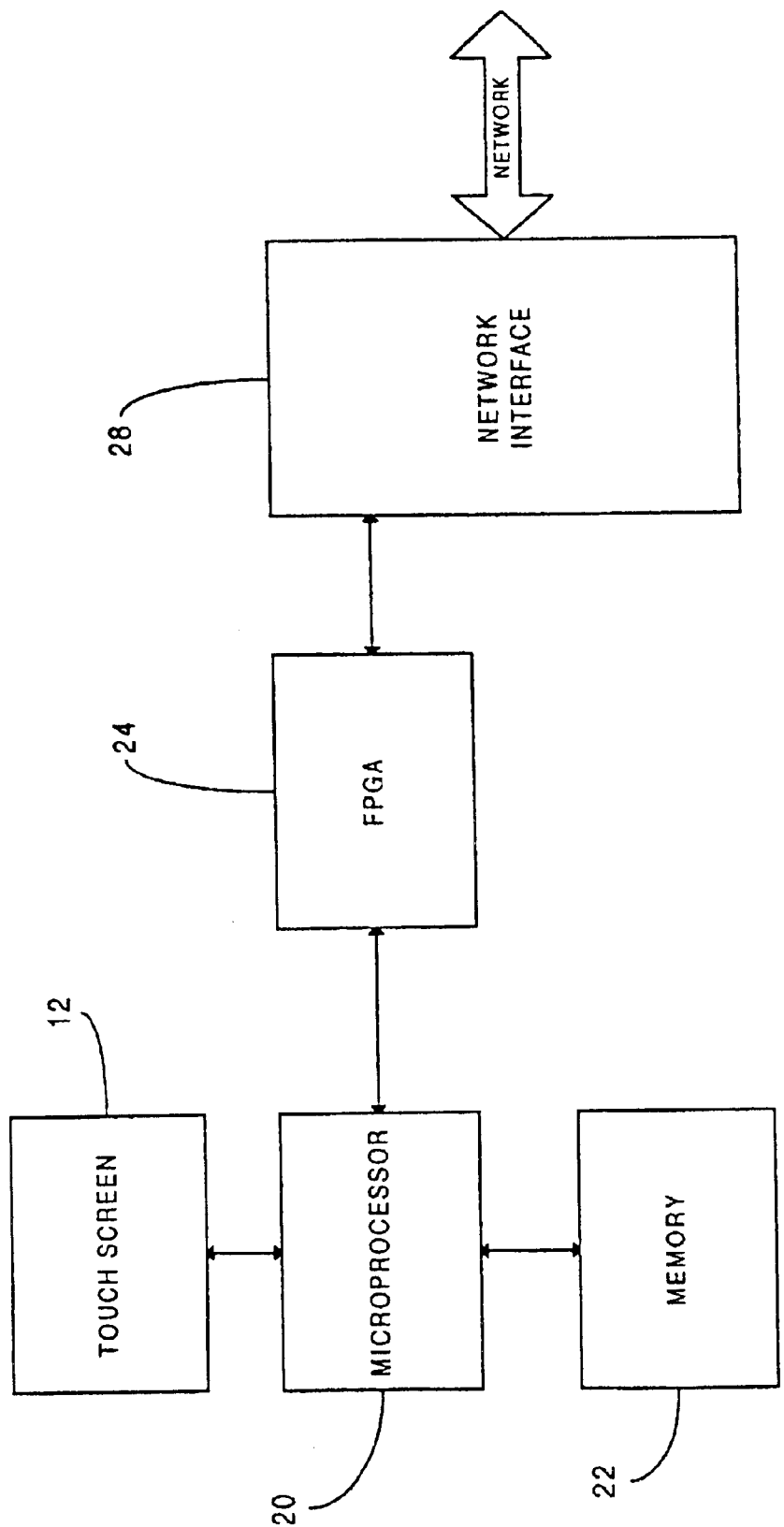
FIG. 2 is a high level block diagram of the test instrument according to the invention.

FIG. 2 is a block diagram showing a high-level representation of the test instrument. A microprocessor 20 interfaces with the touch screen 12 to display and receive information. Memory 22 is provided to the microprocessor. A field programmable gate array 24 also interfaces with the microprocessor. A network interface block 28 handles the details of actual transmission and reception to the network.

Figure 3:
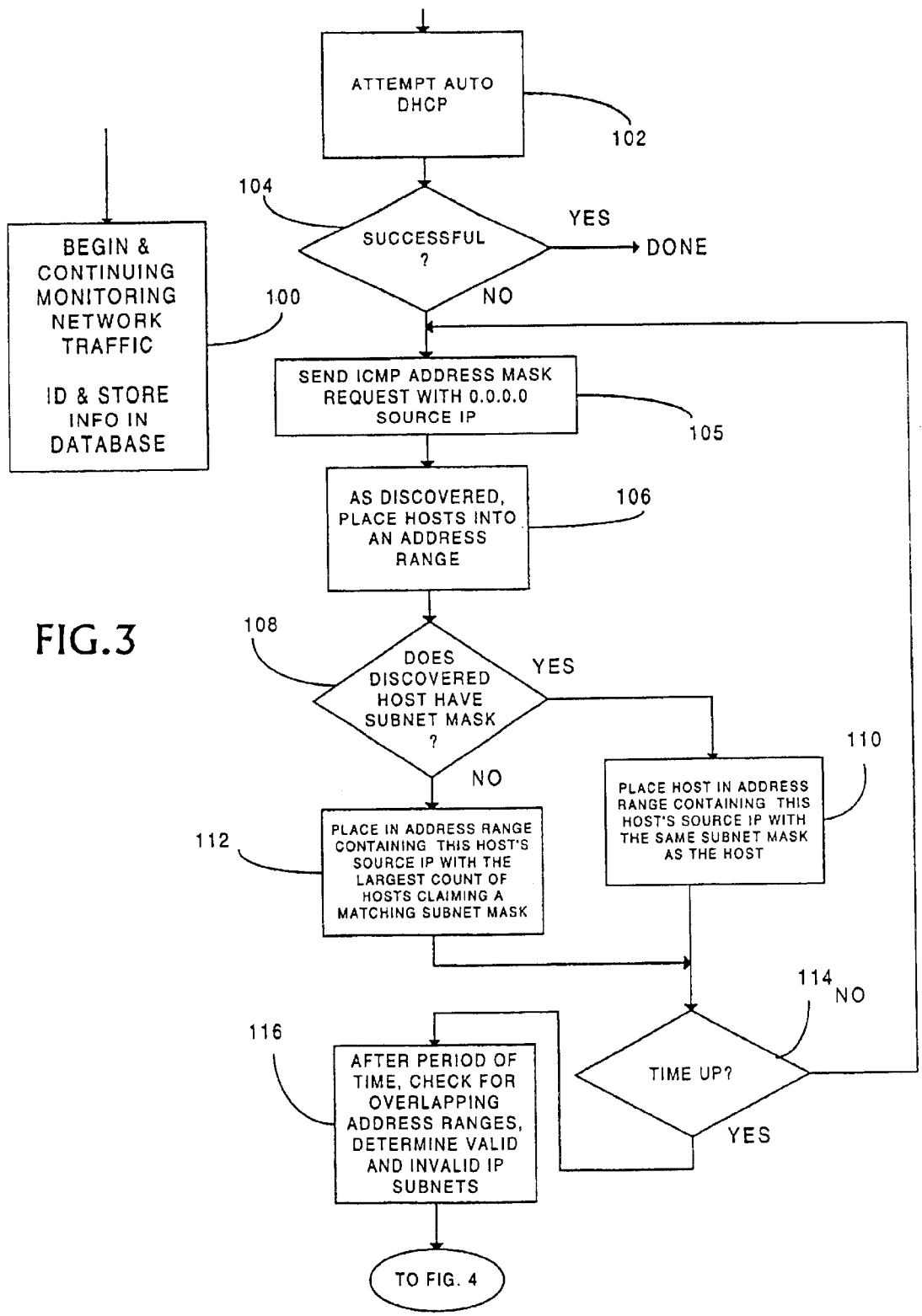
FIG. 3 is a flowchart of steps in obtaining the IP configuration.

Referring to FIG. 3, a flow chart of steps performed by the test instrument according to the invention, initially, when the test instrument is connected to a network, it begins monitoring network traffic (step 100). It continues monitoring traffic, identifying and storing received information in a database as discussed in further detail hereinbelow.

While the monitoring of step 100 is taking place and continues to occur, in parallel with the monitoring, as soon as link is detected, DHCP (dynamic host configuration protocol) is attempted, to try to get an IP address (step 102). As is known in the art, this involves broadcasting a message to locate a DHCP server. If the attempt is successful (decision block 104), the DHCP server responds with an IP address, a subnet mask, default router, DNS server and a duration for which the IP address is valid, and the process of obtaining an IP configuration is done.

However a DHCP server does not exist on many networks or the server may be temporarily unavailable, which could be due to network operation issues that a network technician is trying to resolve, hence the use of the test instrument. In accordance with the prior art, if DHCP was not successful, a prior device would keep trying DHCP, being unable to proceed until DHCP was successful, or until the user manually provided a valid IP configuration (which is extremely difficult if the user has no prior knowledge of the attached network).

According to the test instrument, device or method described herein if DHCP was not successful, an Internet Control Message Protocol (ICMP) address mask request is sent, with a zero source IP (0.0.0.0) (step 105). ICMP is a protocol that does many things, including permitting routers to inform other hosts of IP configuration information, for example. An ICMP address mask request is one of few IP packet types that are defined to allow a reply to a zero source IP (0.0.0.0). Most IP packets are discarded by a TCP/IP stack if the source IP is zero. In response to the ICMP request, some more addresses of hosts with the corresponding subnet mask are learned because some Will reply with a broadcast back to 255.255.255.255. Some routing protocols (OSPF and RIP2, for example) will advertise the subnet mask.

The system continues to monitor traffic on the network, collecting information from traffic and responses generated to the ICMP request. As local hosts are discovered by the monitoring of block 100, step 106 is performed, placing discovered host on the network into an address range. A host is the name given to any device that may be addressable on the network. IP addresses that are not local to the attached network are identified and discarded (most routing protocols and ARP requests are from local hosts, for example).

In decision block 108 a determination is made whether the discovered host reported a subnet mask. If it does, then the host is placed in a database in an address range containing the source IP address for that host and the same subnet mask as the host (step 110). If the result of the decision block 108 is that the discovered host has not reported a subnet mask, then this particular host is placed in an address range containing this host's source IP with the largest count of hosts claiming a matching subnet mask (step 112). After either of step 110 or 112, a decision is made (block 114) as to whether a sufficient amount of monitoring time has passed, and if not, processing continues with step 106 as additional hosts are discovered. The amount of monitoring time can vary, but typically may comprise in the neighborhood of 20 seconds as an example. The time may be predetermined, or, may vary depending on the volume of available data based on network traffic. Less traffic in a given period of time would suggest providing a longer time period for monitoring, so as to provide a more robust data set. Once the period of time is up, then a validation process is performed to determine valid and invalid address ranges (step 116). This process includes checking for overlapping address ranges, determining valid and invalid IP subnets. The determination is made using the best consensus based on how many hosts claim a particular subnet mask. Then, in step 118, any hosts that have been placed in an invalid range are moved to an appropriate validated range (step 118). Processing then continues with the steps discusses in connection with FIG. 4.

Figure 4:
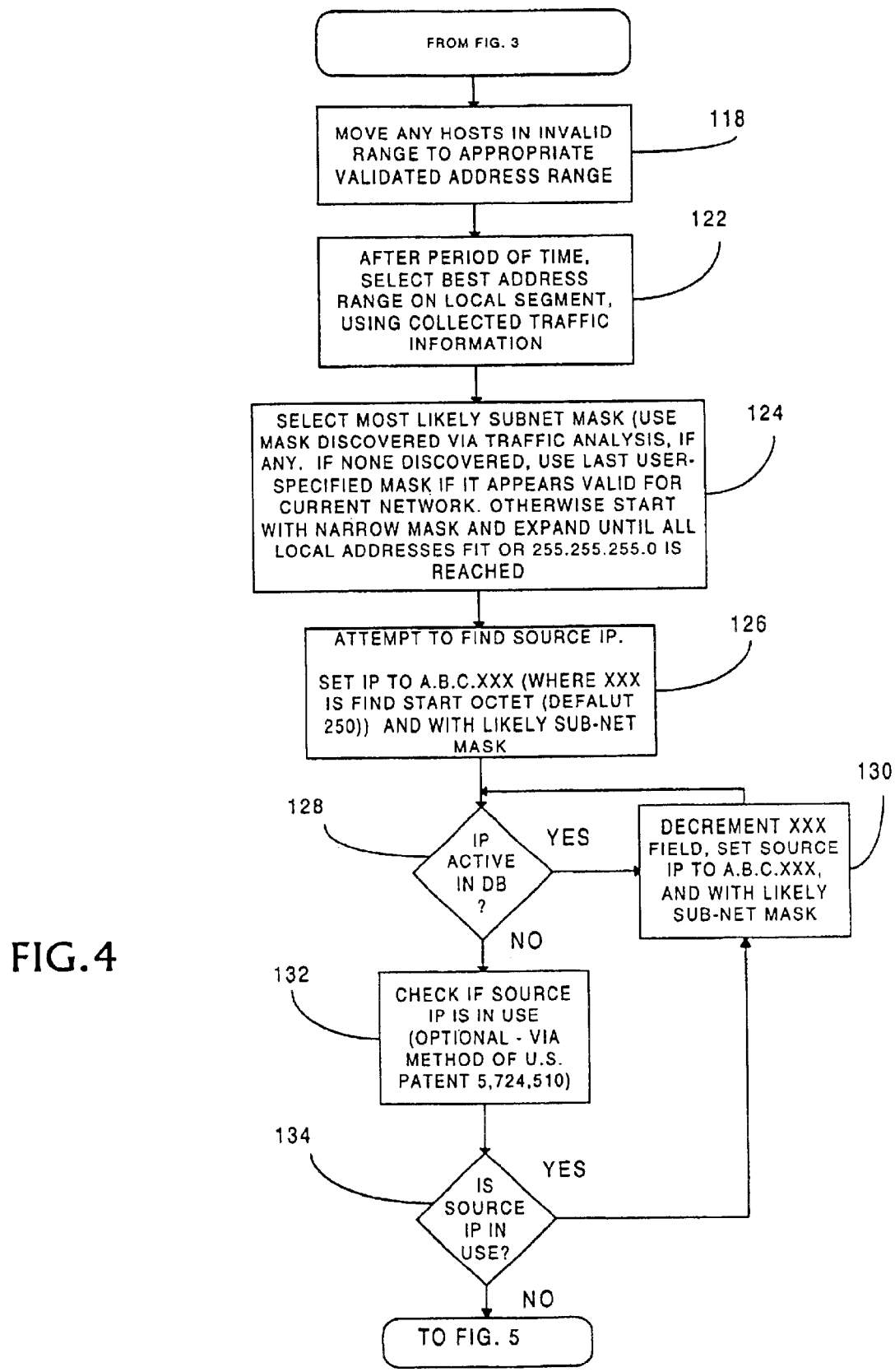
FIG. 4 is a flowchart of further steps in obtaining the IP configuration.

Referring now to FIG. 4, a further flow chart of steps performed according to the invention, after a period of time (block 122) a best address range on the local segment is selected, using the collected traffic information. To select the "best" address range, IP subnets where a subnet mask has been discovered or where a router has been found are preferred. Next in the preference hierarchy is to use the IP subnet that contains the most hosts. Once this local address range has been selected, then step 124 is performed, wherein the most likely subnet mask is selected. This subnet mask will only be used for selecting the test instrument's source IP, and may not actually be used (if, for example, a better one is found later on). To select a subnet mask, if the subnet mask has been discovered as a result of traffic analysis, then that discovered subnet mask is used. If not, then the last user-specified subnet mask is used, if it appears to be valid for the current network. The entire last manual configuration is saved, and can be used if desired. Otherwise, a very narrow subnet mask is tried, and is expanded until all local addresses in the selected best address range fit within the subnet mask, or until 255.255.255.0 is reached. For example, an initial subnet mask of 255.255.255.248 may be tried. If that does not work, that is, if all the local addresses in the selected best address range found during monitoring do not fit within that mask, then another least significant bit is cleared in the mask, for example, resulting in 255.255.255.240. If that mask and subsequent masks are not appropriate, successive masks of 255.255.255.224, 255.255.255.192, and 255.255.255.128 are tried. Finally, if the mask reaches 255.255.255.0, that is employed as the subnet mask for selecting the test instrument (or other device) source IP.

Next, in step 126, the test instrument attempts to find a source IP. Initially, the IP is set using a start octet value, which may be pre-selected to a particular value by a user, or, which, if not selected by the user of the test instrument, defaults to a start value, suitably 250. Thus, given a particular "best" IP address range A.B.C.XXX, then start octet value is substituted for XXX, and the subnet mask is applied to the A.B.C.XXX value. Next, the discovery database (the database of IP addresses and other information observed or "discovered" on this particular network by the test instrument) is checked (decision block 128) to see if that source IP is active on the network. A, B and C are representative of IP address values, and would depend on the network to which the device was connected. For example, if A.B.C in a particular network is 260.83.10, and the subnet is the .128 to .191 range the instrument would take 260.83.10.128 and add the start octet of 250 (assuming the default start octet of 250 and subnet mask 255.255.255.192) applied with the mask to provide an address of 260.83.10.186. The instrument will initially check to see if 260.83.10.186 has been seen already by looking for that address in the discovery database. If the particular source IP is active, then the source IP is decremented (giving 260.83.10.185) in block 130, and the process loops back to decision block 128, to see if the discovery database has this IP in it already. The process continues decrementing, and checking, until a value is determined that is not an active source IP and the source IP is still within the valid subnet range (.128–.191 in this example).

The process then continues, checking whether the source IP is already in use, by "gratuitous ARP", for example. Optionally, checking may be done in accordance with the methods described in U.S. Pat. No. 5,724,510 (block 132), the disclosure of this patent being herein incorporated by reference. Hosts will typically maintain an ARP cache, which stores the 48-bit media access control address for other hosts on the network. However, employing the optional steps provides an additional double check, because the desired goal is to avoid corrupting the ARP caches (which can happen if an IP address which is already in use is tested with "gratuitous ARP"), and to avoid generating console error messages at an administrators console or log file errors. If the source IP is in use by another host (decision block 134), then the process continues at block 130, wherein the XXX field is further decremented to attempt another source IP. Checking the source IP against the discovery database of IP addresses already discovered speeds up the process of automatically finding an IP address, and reduces unnecessary network traffic that would result from attempting to check the availability by generating network requests.

Figure 5:
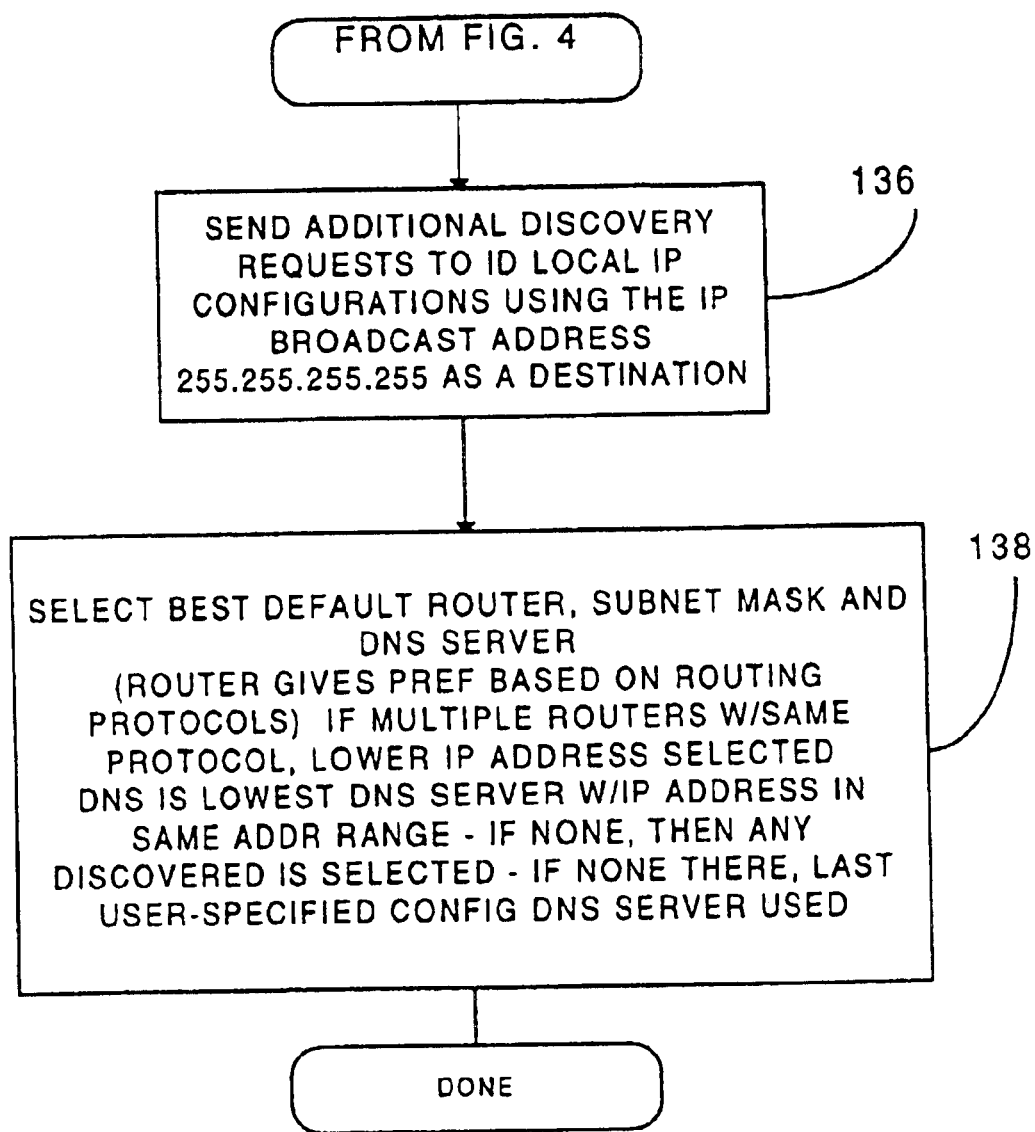
FIG. 5 is a flowchart of still further steps in obtaining the IP configuration.

If, however, at decision block 134, the source IP is determined to not be in use, the processing continues with the steps illustrated in FIG. 5. Referring to FIG. 5, at block 136, additional discovery requests are sent over the network to identify local IP configurations, since TCP/IP stacks will now respond (since we have a valid source IP). These requests include, for example, and ICMP Router Solicitation, and ICMP address mask, ICMP echo, SNMP mask request and a DNS Discovery request, to obtain more information about the network configuration and hosts thereon. These requests are sent to the limited IP broadcast address 255.255.255.255 to quickly solicit responses from all local hosts.

After these additional discovery requests have been processed, the test instrument selects the best default router, the best subnet mask and the best DNS server that have been found (block 138). To determine the best default router, all router IP address that are in the same address range as the test instrument are compared. The preferred router is selected based on the routing protocol being used. For example, in the preferred embodiment, OSPF protocol (Open Shortest Path First) is given a higher ranking, followed by EIGRP (Enhanced Interior Gateway Routing Protocol), etc. Other protocols that are lower on the hierarchy are RIP (Routing Information Protocol) and IRDP (ICMP Router Discovery Protocol). If multiple IP addresses are found with the same routing protocol preference in the hierarchy, the lower IP address is selected. The DNS server selected is the lowest DNS server IP address in the same address range as the test instrument. However, if there is no DNS server that has been found in the same address ranges as the test instrument, then any discovered DNS server is selected. If no DNS server has been discovered, then the DNS server from the last user-specified configuration is employed.

After the test instrument or other device has completed the automatic IP configuration process, a periodic timer may be started to occasionally validate and automatically correct the configuration. This is suitably employed only if a fully automatic configuration has been used. If the configuration is manually set or partially assisted by the user, the automatic correction is preferably skipped. The period timer is suitably 5 seconds in a preferred embodiment, and, after a longer period has elapsed, e.g. 5 minutes, the automatic correction process can suitably be stopped.

The test instrument can now automatically run segment discovery tests in parallel with the previously mentioned automatic correction steps to analyze all the network devices within the broadcast domain (the part of a network that receives the same broadcasts) to detect local hosts, switches, routers, servers, and other network devices. Further addressing information such as IP addresses, MAC addresses, subnet masks and such are thus suitably discovered. This is suitably accomplished by unicast traffic, since some devices may not respond to broadcasts. A detailed database of the various devices and networks is compiled. The auto-correction process employs the database to update the IP configuration if a better router, DNS server or proper subnet mask is identified.

Figure 6:
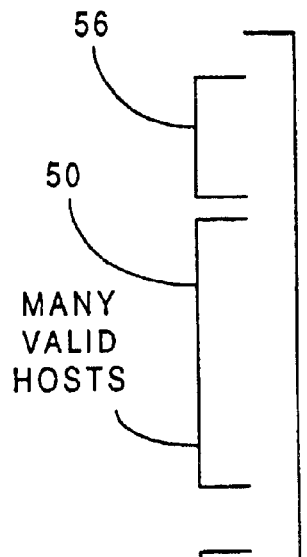
FIG. 6 is a representative graphic showing address range validation and "best" address range selection in one possible situation.

An example of validation in a particular situation is illustrated in FIG. 6, is a representative graphic showing address range and host locations wherein multiple non-contiguous groups of address ranges with corresponding subnet masks are found. In FIG. 6, many valid hosts are located in the address range 50. Additionally, a few hosts are in address ranges 52, and 54, while some greater amount of hosts are in address range 56 (but still fewer than the number of hosts in range 50). In the situation of FIG. 6, all address ranges are validated and the address range in region 50 is selected as the "best" address range.

Figure 7:
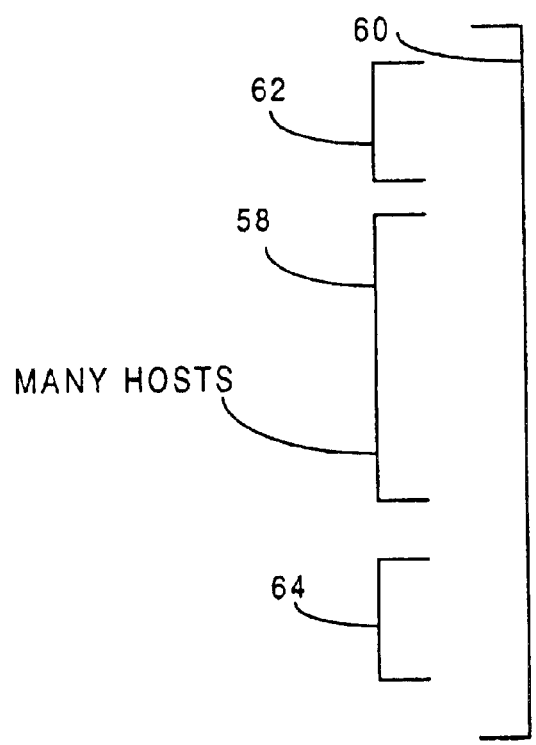
FIG. 7 is a representative graphic showing address range validation in another possible situation.

FIG. 7 is a representative graphic showing validation in another possible situation. In this configuration, a group of many hosts is contained within the bounds of an address range 58 that is completely contained within a larger address range 60. In this configuration the hosts in address range 58 are validated, while those in ranges 62 and 64 are left unvalidated due to conflicting information.

In the validation process, hosts are initially placed where they claim to belong. After validation, a host is put within the first validated address range that it fits into. If there is no valid address range that the host fits into, it is placed where it claims to want to be, if it has a subnet mask, or in any address range with the most hosts that the host fits into.

Therefore, according to the invention, an apparatus and method for obtaining a valid IP configuration automatically has been shown and described. A test instrument may thereby obtain an IP address without causing networking problems on the network. While the illustrated embodiment is mainly described in the case of a network test instrument, the invention is also suitably applied to automatically obtain an IP configuration for other devices that may connect to a network. For example, a portable computer (lap top, notebook, etc.) employing the method or apparatus of the invention can advantageously be connected to a network and automatically obtain an IP configuration.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method for automatically obtaining a valid IP configuration in a local area network, comprising the steps of:
   monitoring network traffic and validating at least one IP subnet;
   selecting a likely unused IP address in the at least one IP subnet; and
   determining whether the selected IP address is unused, wherein said validating at least one IP subnet comprises:
   selecting a narrow subnet mask,
   determining whether a range of monitored network addresses fit within said selected narrow subnet mask, and
   successively increasing the width of the subnet mask and determining whether the range of monitored addresses fit within the subnet mask until the range of monitored addresses fit,
   wherein said successively increasing step is terminated when the subnet mask reaches a specified width.

2. A method for automatically obtaining a valid IP configuration in a local area network according to claim 1, further comprising the step of: attempting dynamic host configuration protocol (DHCP) prior to said step of monitoring network traffic and validating and said step of selecting a likely unused IP address, and skipping said monitoring and selecting steps if said step of attempting DHCP is successful.

3. A method for automatically obtaining a valid IP configuration in a local area network according to claim 1, wherein said monitoring step includes identifying local addresses.

4. A method for automatically obtaining a valid IP configuration in a local area network according to claim 3, wherein said monitoring step further includes identifying subnet masks corresponding to said local addresses.

5. A method for automatically obtaining a valid IP configuration in a local area network according to claim 1, wherein said monitoring step includes identifying local routers.

6. A method for automatically obtaining a valid IP configuration in a local area network according to claim 1, wherein said monitoring step includes identifying local servers.

7. A method for automatically obtaining a valid IP configuration in a local area network according to claim 1, comprising the step of selecting a likely unused IP address comprises sending an Internet Control message Protocol (ICMP) address mask request.

8. A method for automatically obtaining a valid IP configuration in a local area network according to claim 7, wherein said step of sending an ICMP address mask is performed with a zero source IP.

9. A method for automatically obtaining a valid IP configuration in a local area network according to claim 1, comprising the step of placing a discovered local host into an address range.

10. A method for automatically obtaining a valid IP configuration in a local area network according to claim 9, further comprising the step of determining whether said discovered local host reported a subnet mask and if so, placing said host in a database address range having the host's source IP address and subnet mask.

11. A method for automatically obtaining a valid IP configuration in a local area network according to claim 9, further comprising the step of determining whether said discovered local host reported a subnet mask and if not, placing said host in a database address range having a largest number of hosts having this host's source IP address and subnet mask.

12. A method for automatically obtaining a valid IP configuration in a local area network according to claim 1, wherein said step of selecting a likely unused IP address in the at least one IP subnet comprises selecting a best address range.

13. A method for automatically obtaining a valid IP configuration in a local area network according to claim 12, further comprising the step of selecting a most likely subnet mask.

14. A method for automatically obtaining a valid IP configuration in a local area network according to claim 13, wherein said most likely subnet mask comprises a mask discovered as a result of traffic analysis.

15. A method for automatically obtaining a valid IP configuration in a local area network according to claim 13, wherein said most likely subnet mask comprises a mask last specified by a user.

16. A method for automatically obtaining a valid IP configuration in a local area network according to claim 13, wherein said most likely subnet mask is selected as a narrow mask, and said mask is expanded until substantially all local addresses in the selected address range fit within said subnet mask or until a limit is reached.

17. A method for automatically obtaining a valid IP configuration in a local area network according to claim 12, wherein a source IP start value is selected as an IP check address, and wherein said step of determining whether the IP address is unused is performed using said IP check address value.

18. A method for automatically obtaining a valid IP configuration in a local area network according to claim 17, wherein if said IP check address is not available, iteratively altering said IP check address, until an available address is determined.

19. An apparatus for automatically obtaining a valid IP configuration in a local area network, comprising:
   network traffic monitor for monitoring and validating at least one IP subnet;
   IP address selector for selecting a likely unused IP address in the at least one IP subnet and determining whether the selected IP address is unused,
   wherein said network traffic monitor validates the at least one IP subnet by
   selecting a narrow subnet mask,
   determining whether a range of observed addresses fit within said selected narrow subnet mask, and
   successively increasing the width of the subnet mask and determining whether the range of observed address fit within the subnet mask until the range of observed addresses fit,
   wherein said successively increasing step is terminated when the subnet mask reaches a specified width.

20. The apparatus for automatically obtaining a valid IP configuration in a local area network according to claim 19, wherein said IP address selector selects a source IP start value as an IP check address and determines whether the IP address is unused is performed using said IP check address value.

* * * * *